Figure 1:
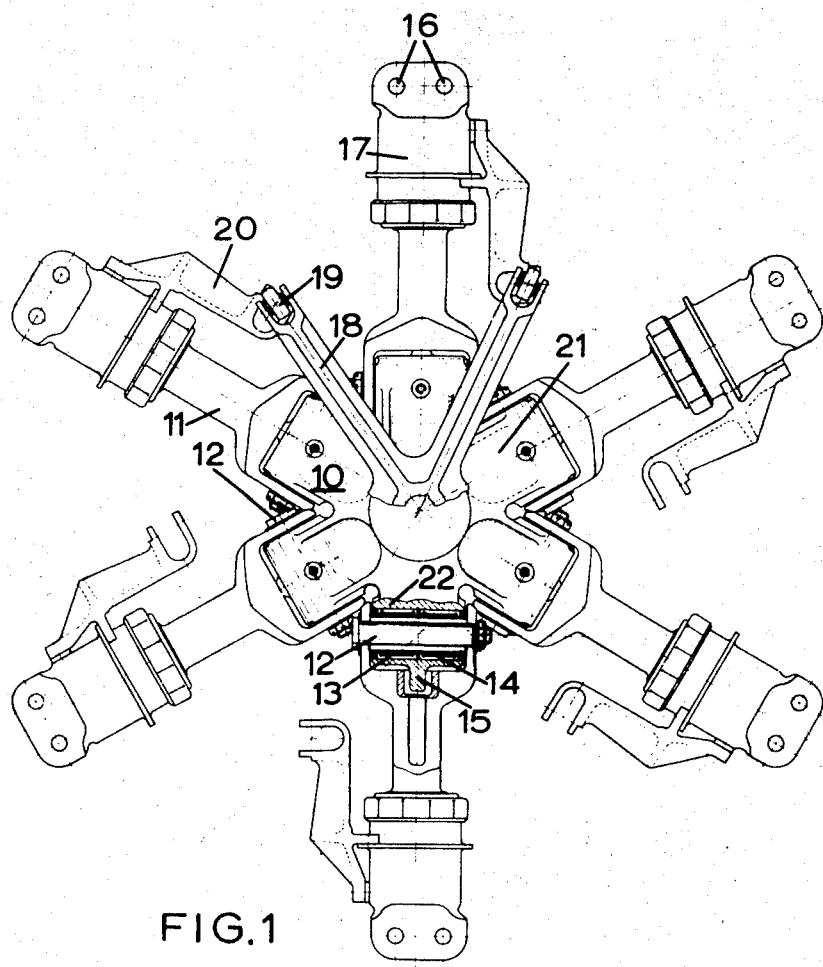

United States Patent

Flux

[15] 3,700,351

[45] Oct. 24, 1972

[54] TAIL ROTOR HUB ASSEMBLY FOR ROTARY WING AIRCRAFT

[72] Inventor: Peter John Flux, Somerset, England

[73] Assignee: Westland Aircraft Limited, Yoevil, Somerset, England

[22] Filed: Feb. 10, 1971

[21] Appl. No.: 114,299

[30] Foreign Application Priority Data

Feb. 27, 1970 Great Britain............9,613/70

[52] U.S. Cl. ..................416/123, 416/168, 416/198
[51] Int. Cl. ..............................................B64c 27/08
[58] Field of Search......416/107, 123, 140, 141, 168, 416/198, 200, 244

[56] References Cited

UNITED STATES PATENTS

| | | | |
|---|---|---|---|
| 2,795,284 | 6/1957 | Sikorsky | 416/123 UX |
| 3,232,349 | 2/1966 | Ballauer | 416/168 UX |
| 3,448,946 | 6/1969 | Nagatsu | 416/123 UX |
| 3,470,962 | 10/1969 | Cure | 416/244 UX |
| 3,533,713 | 10/1970 | Salmun | 416/140 |
| 3,552,880 | 1/1971 | Fischer | 416/141 X |
| 3,589,835 | 6/1971 | Linden | 416/140 X |
| 3,591,310 | 7/1971 | Mouille | 416/141 X |
| 3,592,559 | 7/1971 | Ward | 416/200 X |

*Primary Examiner*—Everette A. Powell, Jr.
*Attorney*—Larson, Taylor and Hinds

[57] ABSTRACT

A tail rotor hub assembly for a rotary wing aircraft comprises a rotor hub having six radially extending arms arranged in three diametrically opposed pairs, each arm being adapted to support a tail rotor blade, the arms of each pair being staggered so that during operation the arms rotate in two separated planes, the staggered pairs being arranged so that alternate arms rotate one in each of the separated planes and groups of three arms rotate in each plane. The rotor hub and arms are of one piece construction, a common pitch change control mechanism is adapted for connection to all blades, and blade flapping control stops are integral with the rotor hub.

5 Claims, 2 Drawing Figures

TAIL ROTOR HUB ASSEMBLY FOR ROTARY WING AIRCRAFT

This invention relates to a rotor hub, particularly, but not exclusively, for accommodating a multiplicity of rotor blades for the tail rotor of rotary wing aircraft.

With the large number of roles in which rotary wing aircraft are expected to be able to operate and the uprating of the engine or engines to cater for such changes of operation, the need for an improved yaw control has become more apparent, for instance, the carrying of loads which necessitate the aircraft flying at its maximum all-up weight under tropical conditions at relatively high altitude has shown that existing tail rotor blades have to operate at a coarse pitch setting, thereby using a higher percentage of the engine horsepower available with resultant lower efficiency.

Similar conditions exist when a rotary wing aircraft is used to tow waterborne craft under emergency conditions such as a breakdown at sea, when due to the position of the ship it would not be possible for a tug or similar vessel to arrive in time.

Tests have been carried out on a multibladed tail rotor to check the theory by bolting two rotor hubs together. This system provided useful information but was mechanically unacceptable, firstly due to a considerable increase in weight which could be expected with a double hub, and secondly a complicated pitch change mechanism of large dimensions. Other disadvantages resulting from the double hub were a greater degree of staggering of the blades than was necessary with the resultant difficulty of tuning each blade relative to the other blades.

This invention provides a rotor hub wherein these disadvantages have been eliminated.

According to the invention I provide a rotor hub for rotary wing aircraft, said hub supporting a multiplicity of radially arranged rotor blades, wherein each blade is offset to its preceding and following blade and located on a radial centerline from the axis of said hub.

In a preferred embodiment of the invention the rotor hub is a single piece hub, preferably machined from a forging, with the blade root attachment portions kept to minimum dimensions to enable the securing bolts to be located close to the main body of the rotor hub, thereby enabling the overall diameter of the blades to be kept to a minimum without affecting the span or the chord of the blade itself. This is made possible by the staggering of the blades which in certain cases of operation could result in a reduction of the rotor R.P.M. (revs. per minute), with a decrease in the tip speed of the blades producing improved efficiency.

In another feature of the invention provision is made for the incorporation of feathering hinge mounts to enable changes of pitch to be effected by rotation of the blades.

In a further feature of the invention blade flapping is provided by bearing hinges with limiting stops.

Figure 2:
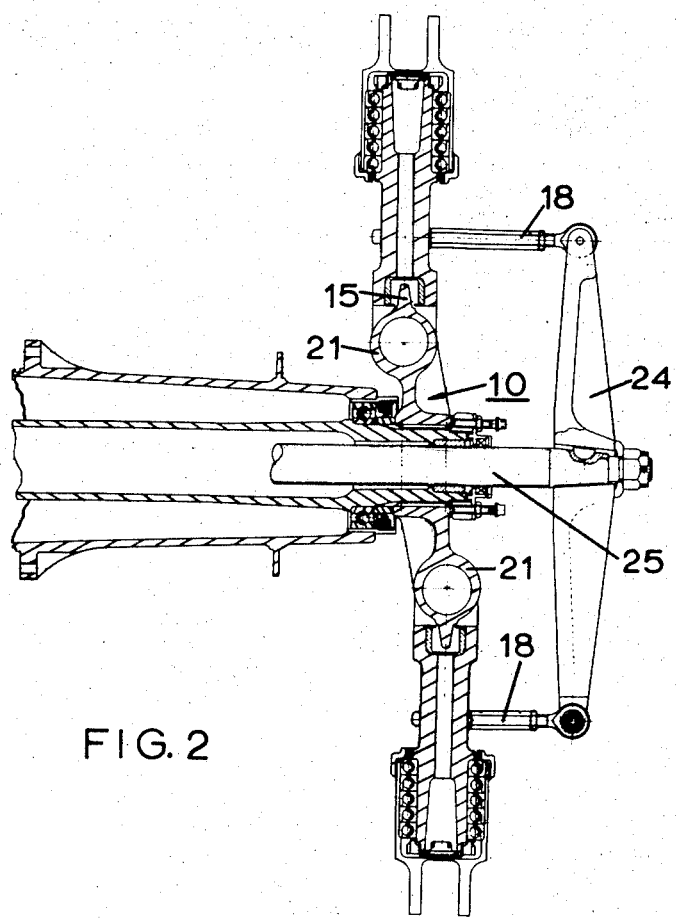

The invention will now be described with reference to the accompanying drawings, in which:

FIG. 1 shows a plan view in part section of the single piece hub, the blade attachment members and the pitch change mechanism, and FIG. 2 shows a sectioned side elevation of the single piece hub, and the pitch change mechanism.

Referring to FIG. 1, the one piece hub is generally indicated at 10, and is manufactured from a single forging provided with six arms 21 alternately staggered, each arm incorporating a housing 22 to accommodate the flapping hinge needle rollers 14, bush 13 and bolt 12, which secures the radial blade attachment members 11 to the arms 21.

The degree of flapping of the radial blade attachment members 11 is controlled by stops 15 (FIG. 2).

The tail rotor blades (not shown) are attached at point 16 to feathering hinge mount 17 which forms part of the radial blade attachment member 11.

Changes of pitch or incidence of the blades are effected by rotation of each feathering hinge mount 17 by means of linkage 18 attached by universal joint 19 to lug 20 which is part of or integral with feathering hinge mount 17.

Referring to FIG. 2 which shows a sectioned side elevation of the single piece hub indicated at 10, two of the six arms 21 which are part of the hub forging are shown with the relative stagger between one blade and another. This has been kept to a minimum consistent with mechanical efficiency, giving easy maintenance, for instance, any one of the securing bolts 12 can be removed without disturbing in any way the preceding or following securing bolts.

The blade pitch changing linkage 18 already described is shown connected to a beam member 24 attached to sliding shaft 25, this shaft passing through the hub itself. It will be noted that linkages 18 are of two different lengths to provide correct symmetry in relation to beam member 24. Each of the linkages are adjustable in length, and by this means tuning of the blades is made comparatively easy. By the term "tuning," we mean the adjustment of the basic pitch of each blade to give a balanced pitch change when such changes are applied collectively, and the dynamic balancing of the blades.

It will be appreciated that modifications may be incorporated without departing from the scope of the invention, for instance, the shape of the single piece hub may be changed to suit any particular installation or power driving means.

I claim as my invention:

1. A tail rotor hub assembly for a rotary wing aircraft comprising a rotor hub having six radially extending arms arranged in three diametrically opposed pairs, each arm being adapted to support a tail rotor blade, the arms of each pair being staggered so that during operation the arms of each pair rotate in two separated planes, the staggered pairs being arranged so that alternate arms rotate one in each of the separated planes and groups of three arms rotate in each plane.

2. A tail rotor hub assembly as claimed in claim 1 wherein the rotor hub and arms are of one-piece construction.

3. A tail rotor hub assembly as claimed in claim 2 further comprising a common pitch change control mechanism adapted for connection to all six blades.

4. A tail rotor hub assembly as claimed in claim 3 wherein a portion of the pitch change mechanism passes through the hub.

5. A tail rotor hub assembly as claimed in claim 2, wherein blade flapping control stops are provided integral with the rotor hub.

* * * * *